Jan. 31, 1967     H. F. YOUNG     3,300,858
BLADE-CONNECTING MEANS
Filed March 30, 1965     2 Sheets-Sheet 1
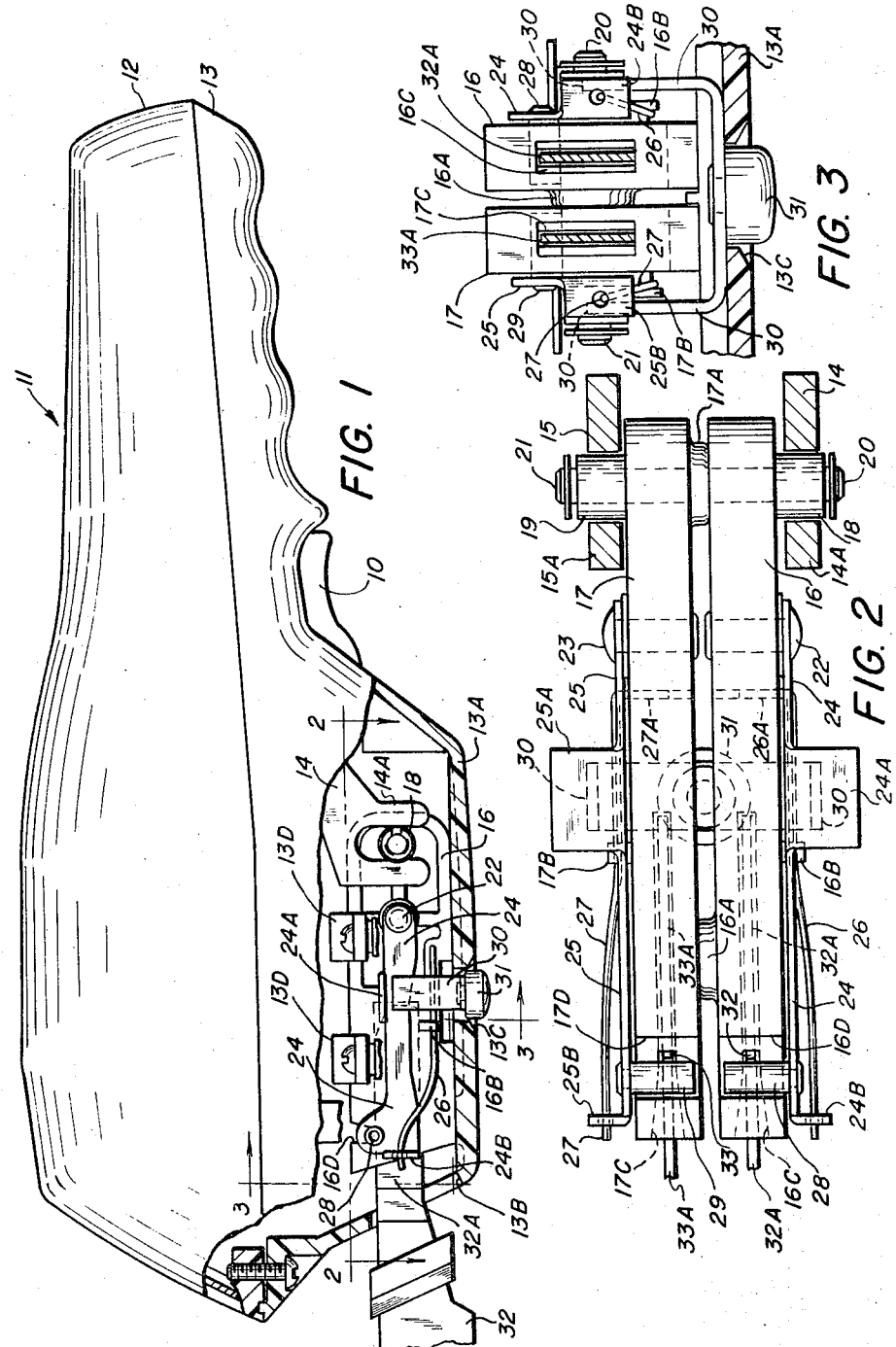
INVENTOR.
HERBERT F. YOUNG United States Patent Office 3,300,858
Patented Jan. 31, 1967

3,300,858
BLADE-CONNECTING MEANS
Herbert F. Young, Mansfield, Ohio, assignor to Dominion Electric Corporation, a corporation of Ohio
Filed Mar. 30, 1965, Ser. No. 443,866
8 Claims. (Cl. 30—272)

My invention relates to blade-connecting means utilized for operatively coupling and uncoupling the blades to the driving mechanism of an electric knife.

The present invention is a modification of the knife coupling arrangement illustrated in co-pending U.S. patent application Serial No. 392,886 filed August 28, 1964.

My invention is directed to a novel means for coupling and uncoupling a knife blade to a coupling member reciprocal relative to a handle regardless of the position reached by the coupling member during its reciprocal movement relative to the handle through an uncoupling accomplished by an actuating member carried by the relatively fixed handle; and for coupling and uncoupling two such blades to two coupling members reciprocal relative to the handle and to each other regardless of their positions relative to the handle and to each other during their respective reciprocal movements through a simultaneous uncoupling accomplished by a single actuating member carried by the relatively fixed handle.

An object of the present invention is to provide ready and convenient means for coupling and uncoupling the knife blades to the reciprocal knife-engaging elements in the handle structure of an electric knife.

Another object is the provision for certainty and safety in the coupling of knife blade shanks to reciprocal elements in an electric knife structure, assuring continued connection during operation and also permitting quick and ready disconnecting of the knife blades from the knife-engaging elements.

Another object is the provision for the ready insertion of knife blades into the handle structure of an electric knife and for the automatic locking of the knife blades thereto.

Another object is the provision for quick and easy uncoupling of knife blades from the knife-engaging elements in an electric knife structure without sacirficing safety and certainty in the operation of the knife mechanism.

Other objects and a fuller understanding of the invention may be had by referring to the following description and claims, taken in conjunction with the accompanying drawings, in which:

FIGURE 1 is a side view partially in section of a knife blade handle structure showing knife blades coupled thereto;

FIGURE 2 is an enlarge view of my coupling construction looking in the direction of the arrows 2—2 of FIGURE 1;

FIGURE 3 is an enlarged cross-sectional view looking in the direction of the arrows 3—3 of FIGURE 1;

Figure 4:
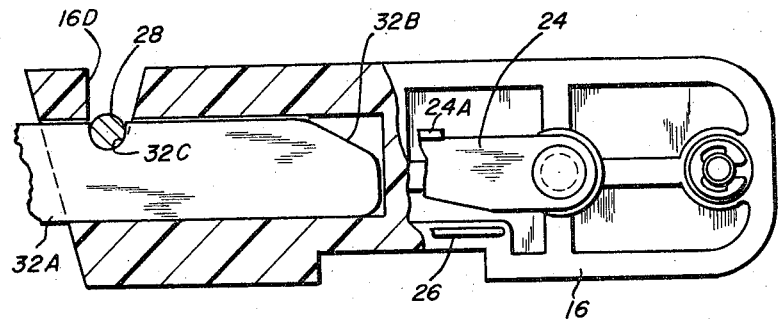
FIGURE 4 is an enlarged view partially in section showing one of the knife-engaging elements having the knife shank inserted therein and locked thereto.
Figure 5:
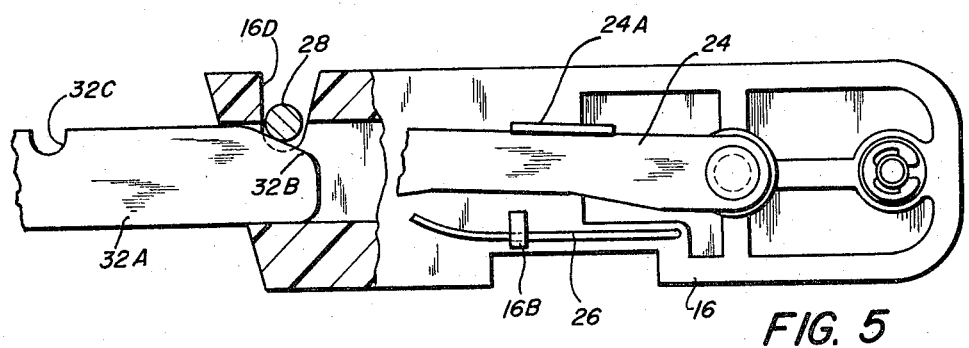
Figure 6:
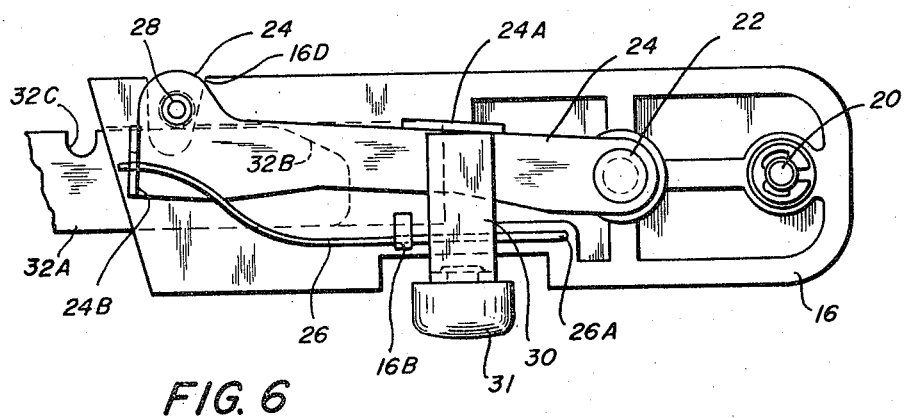

FIGURE 5 is a view somewhat similar to that of FIGURE 4 and showing the relative position of the knife-engaging element and the knife shank upon insertion of the shank into the knife-engaging element at an initial stage of the insertion; and FIGURE 6 is a view somewhat similar to that of FIGURE 5 and showing the position of the parts upon the unlocking of the knife shank from the knife-engaging element so as to permit withdrawal of the knife shank from the element.

My electric knife has a handle structure of plastic or other suitable electrical insulating material denoted generally by the reference character 11. This handle structure has an electric driving mechanism mounted therein similar to that shown and described in said co-pending U.S. patent application Serial No. 392,886. This handle structure has an electric motor mounted therein which is controlled by a switch actuator 10 protruding from the handle structure. The structure is composed of an upper shell or half 12 and a lower shell or half 13 suitably connected together by screw bolts.

An electric motor drives a mechanism within the structure 11 as shown in said co-pending application so as to alternately rock in opposite directions rocker arms 14 and 15 disposed adjacent to each other and rocking on the same pivot axis.

There are two blade-engaging elements or socket members 16 and 17 disposed parallel to each other and arranged to reciprocate in alternate directions by the rocking of arms 14 and 15, the reciprocation of the elements 16 and 17 being longitudinal of the handle toward and away from an opening 13B through which the knife shanks extend. The coupling mechanism herein described is housed within the enlarged portion 13A of shell 13. To provide for appropriate space between elements 16 and 17, the element 16 has a projecting boss 16A on the side facing the element 17 and the element 17 has a projecting boss 17A on the side facing the element 16. The elements 16 and 17 slide relative to each other along a grooved bearing portion provided in the bottom of enlargement 13A. A roller bearing 18 carried on a pin 20 secured to element 16 is accommodated within the forked end 14A of rocker arm 14. A roller bearing 19 is carried on a pin 21 secured to the element 17, the roller bearing 19 being accommodated in the forked end 15A of the rocker arm 15. The rocking of the arms 14 and 15 provides corresponding reciprocation of the elements 16 and 17 in opposite directions. Saddles or cross-straps 13D extending across the tops of the elements 16 and 17 aid in guiding the longitudinal sliding movements of elements 16 and 17 in their respective reciprocations.

The elements 16 and 17 and the parts carried thereby are substantially similar and the detailed description of element 16 and the parts carried thereby will be considered as applying also to the element 17 and the parts carried thereby. The elements 16 and 17 preferably are made of a suitable molded plastic material, such as molded nylon. Secured to element 16 by means of a rivet 22 is a long sheet metal arm member 24, the rivet 22 securing one end thereof closely to the side of the element 16. The opposite or free end of the arm member 24 has a bent end 24B disposed at right angles to the main portion of the arm member 24 and a small opening is provided in this bent end portion 24B. Intermediate the rivet 22 and the free end of the arm member 24, the arm member has a portion bent over in a plane normal to the major portion of the arm member 24 to form a wing or bent portion 24A. Preferably the wing portion 24A and the bent end portion 24B are integral with the arm 24.

Carried by the arm member 24 adjacent the free end thereof is a pin or stop member 28 which extends at right angles to the plane of the arm member 24. As the arm member 24 swings up and down, as in the disposition of the parts shown in FIGURE 1, on the pivot provided by the rivet 22, the stop member 28 swings upwardly and downwardly therewith toward and away from the axis of the element 16. A notch 16D is formed in the upper portion of the element 16 which extends downwardly toward the axis of the element 16 for accommodating the stop member 28.

To resiliently urge the stop member 28 toward the axis of the element 16, that is, downwardly in the view illustrated in FIGURE 1, a spring member 26 is provided. The spring 26 has a bent end 26A which is inserted in a small hole provided in the element 16 so as to anchor the spring 26 to the element 16 at a distance from the free end of the arm member 24. At a location intermediate to where the bent end 26A is secured to the element 16 and the free end of arm member 24, a small boss or projection 16B extends outwardly from the side of the element 16, the underside of the boss or projection 16B being concave in shape. The side of the spring 26 engages this projection 16B at that location upon the spring 26 being moved upwardly and against the projection. The free end of the spring 26 is extended through the said small opening in the bend end portion 24B. The spring 26 being made of spring steel and formed as illustrated is flexed in order to insert the free end thereof through the opening in the bend end portion 24B and against the projection 16B. By this arrangement, the arm member 24 is resiliently biased downwardly toward the bottom wall of enlarged portion 13A and hence the stop member 28 carried by the free end of the arm member 24 is urged toward the axis of the element 16, that is, inwardly of a throat or bore 16C longitudinally along the axis of element 16. The bore or throat 16C defines the path through which a blade shank moves in being inserted into and being withdrawn from the element 16.

In a similar manner, an arm member 25 of the same construction as arm 24 is secured by a rivet 23 to the element 17 so as to permit the arm member 25 to swing on the axis provided by rivet 23. A similar spring member 27 has a bent over portion 27A anchored in like manner to the element 17 which portion 27A engages under a similar projection 17B extending from element 17. The free end of the spring 27 is similarly secured to the bent end portion 25B of arm member 25 so as to resiliently urge the arm member 25 downwardly toward the bottom wall of enlargement 13A. A pin or stop member 29 carried by the free end of arm member 25 is similarly resiliently urged toward the axis of element 17 through the cross-notch 17D provided therein. Similarly the arm member 25 has a wing portion 25A extending outwardly therefrom at a location intermediate its ends. In a similar manner, the stop member 29 is resiliently urged into the path of a blade shank inserted into and withdrawn from a bore 17C in the element 17 and extending along the axis thereof.

Disposed in the enlargement 13A below the two wing portions 24A and 25A and across below the two elements 16 and 17 is a U-shaped saddle member 30. This saddle member 30 has its two free ends extending upwardly toward the wing portions 24A and 25A and the base of the U-shaped saddle member extends across below the two elements 16 and 17. A button member 31 of plastic or the like is secured to the bight or base of the saddle member 30 by a rivet or other suitable means. This button member 31 extends through an opening 13C provided at that location in the bottom wall of enlargement 13A whereby the button member 31 may be manually pressed by the operator of the electric knife from the exterior of the knife handle.

The electric knife structure utilizes two parallel closely adjacent blades 32 and 33 which are reciprocated in opposite directions. Blade 32 has a shank portion 32A and blade 33 has a shank portion 33A. These shank portions are disposed to be inserted into and withdrawn from the elements 16 and 17, respectively, in order to couple and uncouple the blades from the kife handle. The blade shank portions are similar in shape and dimension. At the rearward end of shank 32A, that is, at its end initially inserted into the element 16, and edge portion thereof is inclined or sloped to form the inclined camming surface 32B. At a location spaced from the said rearward end of the portion 32A there is provided a cross-notch or dwell 32C. This dwell 32C extends inwardly of the shank portion 32A along the same edge of the shank portion as is the inclined camming surface 32B as shown in the drawings. The shank portion 33A has a similar camming surface and a similar dwell portion formed therein.

When the shank portions are entirely removed from the elements 16 and 17 in the knife handle, the two stop members 28 and 29 are resiliently biased toward the axes of the elements 16 and 17 and hence athwart the paths traveled by the shank portions during insertion and withdrawal from the elements 16 and 17. Upon inserting a shank portion, such as shank portion 32A, into an element, such as element 16, the parts first assume the initial relative position shown in FIGURE 5. Here the camming surface 32B engages the under-surface of stop member 28 as illustrated. Further insertion of the blade shank 32A causes the camming surface 32B to cammingly raise the stop member 28 upwardly in the notch 16D and out of the path of the shank portion 32A so that the stop member 28 slides along the upper or outer-edges of the shank portion 32A as it is further inserted into the element 16. Upon the insertion of the shank portion 32A to where the rear end thereof is in the location shown in FIGURE 4, the stop member 28 registers with or is opposite the dwell portion 32C. At this point, the resilient bias imposed on the arm member 24 and hence on the stop member 28 causes the stop member 28 to move downwardly toward the axis of the element 16 and thence into the dwell portion 32C. At this position of the parts, as shown in FIGURE 4, the shank portion 32A is locked against withdrawal from the element 16.

When it is desired to raise the stop member 28 upwardly out of the dwell 32C, the operator of the knife presses with a finger upwardly on the bottom of button member 31. This upward pressure on the button member 31 causes the saddle member to be raised upwardly to where the upper ends of the side arms of the saddle member 30 engage the wing portions 24A and 25A of the respective arm members 24 and 25. Further upward pressure on the button member 31 moves the saddle member 30 still farther upward so that the saddle member 30 pushes up and raises the wing portions 24A and 25A and thereby raises or swings upwardly the arm members 24 and 25 against the resilient bias of the springs 26 and 27. This causes the stop members 28 and 29 to be raised upwardly in their respective notches 16D and 17D to where the stop members 28 and 29 clear the shank portions 32A and 33A, respectively. This raising of the stop members out of the respective dwells unlocks the blades from the kife handle and permits the shank portions of the blades to be withdrawn from the elements 16 and 17. Upon withdrawal, the resilient bias of the springs again causes the stop members to move downwardly athwart paths defined by the bores within the respective elements 16 and 17.

It is to be noted that the wing portions 24A and 25A reciprocate with the respective elements 16 and 17 and hence the locations of the wing portions 24A and 25A longitudinally of the knife handle are not always the same relative to the saddle member 30 which moves upwardly and downwardly in a fixed plane relative to the handle member 11. However, by reason of the area of the wing portions 24A and 25A, there is assured an engagement between the tops of the arms of the saddle member 30 and the respective wing portions 24A and 25A regardless of the respective positions where the wing portions 24A and 25A were left during the last reciporcal movement of the elements 16 and 17.

It is thus seen that a safe and convenient method is provided for readily coupling and uncoupling knife blades to the reciprocating mechanism in an electric knife handle.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention as hereinafter claimed.

What is claimed is:

1. In an electric knife device in which a pair of adjacent knife blades are reciprocated in opposite directions by a driving mechanism in the knife handle structure of the device, the improvement of a pair of blade-engaging elements mounted in said handle structure alongside each other for reciprocal movement in opposite directions by said driving mechanism, each of said elements having a socket in which the rear end portion of a respective knife blade may be inserted upon longitudinal movement of a said blade rearwardly toward said handle structure, each of said elements having a pin adapted to extend into locking position across the socket thereof athwart the path of the rear end portion of knife blade being inserted into said socket, each said pin being resiliently biased toward said locking position athwart said path and being movable against said resilient bias away from said locking position so as to clear said rear end portion of the said knife blade, a pair of swingable arm members each carried by a said element to reciprocate therewith and to swing relative to the longitudinal axis thereof, each arm member carrying a said pin to move the pin upon swinging of the respective arm member, each arm member having an abutting portion extending therealong, said rear end portion of each knife blade having an inclined edge providing a camming surface engageable by said pin for cammingly moving said pin against said resilient bias away from said locking position upon the insertion of a knife blade rear end portion into a said socket, said knife blade rear end portion having a dwell portion in alignment with said inclined edge to receive said pin upon the knife blade rear end portion being inserted in the respective socket to position the dwell portion adjacent the pin whereby the said pin in response to said resilient bias enters said dwell portion and locks the knife blade rear end portion against withdrawal from said socket, and a releasing member carried by said handle structure movable in a plane normal to the axis of the handle structure and manually operable from the exterior of the handle structure on the bottom side thereof and positioned to move simultaneously both said pins in opposition to said resilient bias from said locking position to allow both the knife blade rear end portions to be simultaneously released and withdrawn from said sockets, the said releasing member including a U-shaped saddle member having a pair of free end portions within said handle structure and a button portion extending therefrom for access outwardly of said handle structure, said saddle member being generally disposed and movable in said plane, each of said free end portions being formed and positioned to engage and move the said abutting portion of one of said arm members, respectively, in any of its positions in its said reciprocal movement upon the movement of said button portion in a direction inwardly of the handle structure in said plane.

2. A coupling construction for an electric knife for coupling to the driving mechanism in the handle structure of the electric knife the rear end portion of a pair of parallel knife blades to be reciprocated in opposite directions by the said driving mechanism, comprising in combination a pair of socket members disposed parallel to each other in said handle structure and operatively connected to said driving mechanism to be reciprocated in opposite directions generally longitudinally of the handle structure, each said socket member being adapted to receive a knife blade rear end portion inserted longitudinally therein, each knife blade rear end portion having a sloping edge portion extending forwardly from adjacent the rearward end thereof and having a slot formed therein along said sloping edge portion at a longitudinal distance from said rearward end, each said socket member including a stop member adapted to project inwardly of the socket member in the path of a said knife blade rear end portion being inserted into and being withdrawn from the respective socket member, each said socket member including a movable arm member carried by, and reciprocal with, the socket member, each movable arm member carrying one of said stop members to move the respective stop member relative to the socket member upon movement of the movable arm member, resilient means resiliently urging said stop member into said paths in said socket member, and a release member carried by the said handle structure movable in a plane normal to the axis of the handle structure, said release member having a first portion operable from the exterior of the handle structure on the bottom side thereof and having a second portion positioned in said handle structure operatively connected both to said stop members for simultaneously moving both of said stop members against the bias of said resilient means outwardly of said paths to clear the rear end portion of both said knife blades, said second portion including two spaced legs of a saddle spanning both said socket members and extending on opposite sides of the pair of socket members to oppose said movable arm members, respectively, the movement of the release member in said plane toward said arm members causing said spaced legs to engage and move said arm members and the stop members carried thereby to releasing position moving the stop members outwardly of said paths, said arm members being extended along the respective socket members to be engageable by one of said spaced legs of the release member in any of the positions of the arm members during reciprocal movements of the respective socket members and arm members carried thereby, the sloping edge portion of each said knife blade rear end portion providing a camming surface directed to move out of said path, against the resilient bias of said resilient means, the stop member of the respective socket member in which the knife blade rear end portion is inserted during such insertion, each said knife blade rear end portion having a dwell adapted to receive and engage the stop member resiliently moved inwardly of said path by said resilient means after said insertion for preventing withdrawal of the knife blade rear end portion from the respective socket.

3. In an electric knife mechanism having a driving mechanism mounted in the knife handle and a knife blade, said blade having a shank portion formed to provide a camming surface along an edge thereof and a dwell along said edge, the combination of a coupling member mounted in the handle and operatively connected to the driving mechanism to be reciprocated in the handle relative to said handle, said coupling member having a socket into which a said knife blade shank may be inserted, a swingable arm member having one end carried by said coupling member to reciprocate therewith and extending therealong, a stop member carried by the opposite end of said arm member to reciprocate therewith to swing therewith and movable into said socket athwart the path of a said knife shank portion moving longitudinally in and out of said socket, a spring anchored to, and reciprocal with, said coupling member and engaging said arm member to resiliently swing the same in a direction to urge the stop member athwart said path in all positions of the coupling member during its reciprocations, said stop member upon meeting said camming surface of the said knife shank portion during insertion of the shank portion into said socket being cammingly moved by said camming surface from said path, said stop member upon registering with said dwell during insertion of the knife shank being moved by said arm member under the resilient bias of said spring into said dwell and athwart the said path to lock said shank portion against withdrawal from said socket, and a releasing member carried by the bottom wall of the said handle movable in a plane laterally of said handle and positioned to operatively engage said arm member in all of its positions reached in its said reciprocation to move the arm member against the resilient bias of said spring upon actuation of the releasing member for moving said stop member out of said dwell and from said path to permit withdrawal of the said shank portion from said socket, said releasing member spanning said coupling member and extending upwardly therealong in a position to oppose and operatively engage said arm member at varying positions longitudinally of the handle relative to said plane, said releasing member also protruding laterally of the handle and through the bottom wall thereof for actuation from the exterior of the handle.

4. A coupling member as claimed in claim 3 and in which said arm member includes an abutting portion movable with said arm member as the coupling member carrying the said arm member is reciprocated in said handle, and in which said releasing member has an engaging portion movable toward and away from the plane of said abutting portion and positioned to engage the said abutting portion upon movement toward said plane in the varying positions of the abutting portion as said coupling member reciprocates.

5. In an electric knife mechanism, the combination of a handle structure having a driving mechanism therein, a pair of blade-engaging elements mounted parallel to each other in the handle structure and operatively connected to the said driving mechanism to be longitudinally reciprocated in opposite directions relative to the handle structure, a stop member carried by each of said elements and mounted to be swung inwardly toward and outwardly away from the axis of the respective element, an arm member carried by each said element to reciprocate therewith and carrying one of said stop members to move the same upon movement of the respective arm member, a spring carried by each of said elements for biasing the respective stop member carried thereby inwardly toward the axis of the respective element, a common release member carried by the handle structure and arranged therein upon actuation of the release member for moving both said stop members outwardly away from the axes of the said elements against the resilient bias of both said springs in all longitudinal positions of the respective elements reciprocated in said handle structure, said release member including a saddle portion disposed to span said pair of elements and to extend laterally of the handle structure between the outer walls thereof and the next adjacent sides of said pair of elements in a plane to operatively engage both of said arm members in their varying positions during reciprocation with the respective elements, and including a button portion extending through a wall of the handle structure to move the release member laterally of the handle structure upon inward pressing of the button portion, and a pair of interconnected side-by-side relatively reciprocal knife blades each having a shank insertable in a said respective element along the axis thereof, each said shank having a notch adapted to receive a said stop member therein for preventing withdrawal of the shank from the respective element, said stop members both being simultaneously movable from both said notches to permit withdrawal of the shanks from both said elements by the actuation of said common release member.

6. The combination claimed in claim 5 and in which each of said knife blade shanks has an inclined camming surface adjacent the end introduced into the element during said insertion therein and positioned to cammingly move said stop members outwardly away from the respective axes of the elements against the resilient bias of the respective springs to permit the shanks to enter the elements to the location where the stop members are moved by the resilient bias of the respective springs into the said dwells.

7. A coupling structure for coupling the flat shank of each of a pair of interconnected adjacent knife blades reciprocal relative to each other to an electric knife handle having a driving mechanism mounted therein, comprising in combination, each knife blade having formed on the shank thereof an inclined surface along an edge portion thereof, said inclined surface sloping forwardly and outwardly from the rear end thereof, and an indentation in said edge portion of each shank forwardly of said inclined surface, a pair of socket member mounted in said knife handle and operatively connected to the said driving mechanism to reciprocate in said handle relative thereto and to each other, a stop member carried by each said socket member to reciprocate therewith and adapted to project inwardly of the respective socket member into the path of a said knife shank being inserted therein, each said stop member being engageable by said inclined surface of the respective knife shank upon the insertion of the knife shank into the socket member, resilient means carried by said knife handle and disposed to bias both of said stop membes inwardly of the respective socket member into said path of a knife shank being inserted therein, each said stop member upon being engaged by said inclined surface of the knife shank during insertion of the shank into the respective socket member being displaceable against the bias of said resilient means out of said respective paths to permit said insertion, said stop members upon reaching said indentations, respectively, during insertion of the shanks into the socket members being moved by the resilient means into said indentations, respectively, to retain the respective shanks against withdrawal from said socket member, and a spring biased release member carried by said knife handle movable in a plane normal to the axis of the knife handle and operable from the exterior of said handle on the bottom side thereof, said release member being disposed to operatively engage and simultaneously move both said stop members against the bias of said resilient means out of said indentations to permit withdrawal of the said shanks from said socket members, said release member having spaced portions embracing socket members and disposed to operatively engage both said stop members in all positions thereof longitudinally of the said handle relative to said plane, and a button portion extending away from said spaced portions and outwardly of said handle for operation thereof.

8. In a coupling construction for coupling a pair of parallel knife blade shanks to a pair of adjacent socket members, respectively, and carried by an electric knife handle and reciprocal longitudinally thereof relative to each other by a driving mechanism carried by the handle and operatively connected to the socket members for reciprocating the same in opposite directions, the combination of camming means and dwell means carried by each of said shanks and insertable therewith into the respective socket members, detent means carried by each said socket member protrudable into the said socket member into the path of a respective shank, resilient means carried by the knife handle operatively engaging said detent means and biased to resiliently urge said detent means to protrude into the respective socket members and into said path of a said shank therein, and common release means carried by said handle to be operated from the bottom side thereof and operatively connected to both the respective said detent means to move simultaneously the detent means carried by each of the socket members in opposition to the bias of said resilient means away from said path, said release means including spaced portions embracing both said socket members and extending between the socket members and the side walls of said handle to positions for operatively engaging both said detent means in the varying positions of the socket members carrying the respective detent means in the reciprocations thereof, said release means including a button portion extending through the bottom wall of the handle to accessible position for operation of the release means, the arrangement of said camming means, dwell means, detent means, resilient means and release means being such that upon initial insertion of a said shank into a said socket member the camming means carried by the respective shank meets and moves the respective said detent means away from said path in opposition to said resilient means, and upon further insertion of the said shank into said respective socket member the said detent means under the bias of said resilient means moves into said dwell of the respective shank to resist withdrawal of the shank from said socket member, and further that upon operation of said release means both said detent means may be concurrently moved in opposition to said resilient means out of said dwell means of both said shanks to permit withdrawal of said shanks from the respective socket members.

References Cited by the Examiner

UNITED STATES PATENTS

| | | | |
|---|---|---|---|
| 1,813,723 | 7/1931 | Beaver | 30—337 X |
| 1,940,855 | 12/1933 | Friedman | 30—337 X |
| 3,203,095 | 8/1965 | Nelson | 30—272 |
| 3,234,649 | 2/1966 | Preble et al. | 30—272 |

WILLIAM FELDMAN, *Primary Examiner.*

JAMES L. JONES, JR., *Assistant Examiner.*